United States Patent
Wang et al.

(10) Patent No.: US 9,241,346 B2
(45) Date of Patent: Jan. 19, 2016

(54) METHOD AND APPARATUS FOR DATA TRANSMISSIONS IN A WIRELESS NETWORK

(71) Applicant: INTERDIGITAL PATENT HOLDINGS, INC., Wilmington, DE (US)

(72) Inventors: Chonggang Wang, Princeton, NJ (US); Paul L. Russell, Jr., Pennington, NJ (US); Dale N. Seed, Allentown, PA (US); Michael F. Starsinic, Newtown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/543,421

(22) Filed: Nov. 17, 2014

(65) Prior Publication Data
US 2015/0071178 A1    Mar. 12, 2015

Related U.S. Application Data

(63) Continuation of application No. 13/425,814, filed on Mar. 21, 2012, now Pat. No. 8,891,548.

(60) Provisional application No. 61/466,153, filed on Mar. 22, 2011.

(51) Int. Cl.
*H04W 74/08* (2009.01)
*H04W 74/02* (2009.01)
*H04W 74/04* (2009.01)
(Continued)

(52) U.S. Cl.
CPC .............. *H04W 74/08* (2013.01); *H04W 74/02* (2013.01); *H04W 74/04* (2013.01); *H04W 72/1252* (2013.01); *H04W 72/1289* (2013.01); *H04W 84/10* (2013.01)

(58) Field of Classification Search
CPC .... G06F 13/4226; H04B 7/0615; H04B 7/12; H04L 1/1614
See application file for complete search history.

(56) References Cited

U.S. PATENT DOCUMENTS

| | | | |
|---|---|---|---|
| 7,558,225 B2 | 7/2009 | Nakajima et al. | |
| 8,503,357 B2 | 8/2013 | Matsuo et al. | |
| 8,904,207 B2 * | 12/2014 | Kwon et al. | 713/320 |

OTHER PUBLICATIONS

Akyildiz et al., "Wireless Multimedia Sensor Networks: A Survey," IEEE Wireless Communications Magazine, Dec. 2007.

(Continued)

*Primary Examiner* — Chandrahas Patel
(74) *Attorney, Agent, or Firm* — Volpe and Koenig, P.C.

(57) ABSTRACT

A method and apparatus for data transmissions in a wireless network are disclosed. A first device may send a first frame to a second device including information regarding a number of pending data frames to be transmitted from the first device to the second device. The first device receives an acknowledgement frame including a number of approved data frames for transmission from the first device to the second device. The first device then may send a plurality of data frames without performing the contention-based channel access procedure in response to the acknowledgement frame. The first device may send a first frame to a second device for requesting data frames that are pending at the second device. The first device receives an acknowledgement frame including a number of pending and approved data frames. The first device may receive a plurality of data frames in response to the acknowledgement frame.

20 Claims, 11 Drawing Sheets

(51) Int. Cl.
  *H04W 72/12* (2009.01)
  *H04W 84/10* (2009.01)

(56) References Cited

OTHER PUBLICATIONS

LAN/MAN Standards Committee of the IEEE Computer Society, "IEEE Standard for Information technology—Telecommunications and information exchange between systems—Local and metropolitan area networks—Specific requirements. Part 11: Wireless LAN Medium Access Control (MAC) and Physical Layer (PHY) Specifications. Amedndment 5: Enhancements for Higher Throughput," IEEE Std. 802.11n-2009 (Sep. 11, 2009).

LAN/MAN Standards Committee of the IEEE Computer Society, "IEEE Standard for Information technology—Telecommunications and information exchange between systems—Local and metropolitan area networks—Specific requirements. Part 11: Wireless LAN Medium Access Control (MAC) and Physical Layer (PHY) Specifications," IEEE Std 802.11-2007 (Jun. 12, 2007).

LAN/MAN Standards Committee of the IEEE Computer Society, "IEEE Standard for Information technology—Telecommunications and information exchange between systems—Local and metropolitan area networks—Specific requirements. Part 15.4: Wireless Medium Access Control (MAC) and Physical Layer (PHY) Specifications for Low-Rate Wireless Personal Area Networks (PANs)," IEEE Std 802.15.4-2006 (Sep. 8, 2006).

Mangharam et al., "Voice over sensor networks," IEEE International Real-Time Systems Symposium, pp. 291-302 (Dec. 2006).

Sadeghi et al., "Opportunistic Media Access for Multirate Ad Hoc Networks," Proceedings of the 8th Annual International Conference on Mobile Computing and Networking, pp. 24-35 (2002).

\* cited by examiner

| OCTETS: 2 | 1 | 0/2 | 0/2/8 | 0/2 | 0/2/8 | VARIABLE | 2 |
|---|---|---|---|---|---|---|---|
| FRAME CONTROL (610) | SEQUENCE NUMBER | DESTINATION PAN IDENTIFIER | DESTINATION ADDRESS | SOURCE PAN IDENTIFIER | SOURCE ADDRESS | FRAME PAYLOAD | FCS |
| | | ADDRESSING FIELDS | | | | | |
| MHR | | | | | | MAC PAYLOAD | MFR |

| Bits: 0-2 | 3 | 4 | 5 | 6 | 7-9 | 10-11 | 12-13 | 14-15 |
|---|---|---|---|---|---|---|---|---|
| FRAME TYPE | SECURITY ENABLED | FRAME PENDING | ACK REQUEST | INTRA PAN | RESERVED | DEST. ADDRESSING MODE | RESERVED | SOURCE ADDRESSING MODE |
| 612 | | 614 | 616 | | 618 | | | |

METHOD AND APPARATUS FOR DATA TRANSMISSIONS IN A WIRELESS NETWORK

CROSS REFERENCE TO RELATED APPLICATIONS

This application is a continuation of U.S. patent application Ser. No. 13/425,814, filed Mar. 21, 2012, which claims the benefit of U.S. provisional application No. 61/466,153 filed Mar. 22, 2011, the contents of which is hereby incorporated by reference herein.

BACKGROUND

The IEEE 802.15 working group has been formed to create wireless personal area network (WPAN) standards. The IEEE 802.15 defines three classes of WPANs that are differentiated by data rate, battery consumption, quality of service (QoS), and the like. IEEE 802.15.1 defines a medium rate WPAN that may handle a variety of applications and have QoS suitable for voice communications. IEEE 802.15.3 defines a high data rate WPAN that is suitable for applications that require high QoS. IEEE 802.15.4 defines a low rate WPAN that is intended to serve applications with low power consumption and cost requirement and with relaxed needs for data rate and QoS.

SUMMARY

A sender (either a coordinator or a WTRU) may inform a receiver of the number of pending data frames, so that the sender may (continuously) transmit data frames without performing a contention-based channel access procedure to obtain a transmission opportunity on a channel of the network. The data frame transmission may be constrained by the length of active time interval at the receiver or by the fairness consideration among different nodes. The transmissions in accordance with this scheme may reduce overhead introduced by control commands, for example, data request command, and may improve transmission latency, energy-efficiency and channel utilization. The embodiments may be implemented by using several reserved and unused bits in a frame control subfield of a medium access control (MAC) header in an MAC frame.

In one example embodiment, a first device may send a first frame to a second device including information regarding a number of pending data frames (NPD) to be transmitted from the first device to the second device. The first device receives an acknowledgement frame including information regarding a number of approved data frames (NAD) for transmission from the first device to the second device. The first device then may send a plurality of data frames without performing the contention-based channel access procedure in response to the acknowledgement frame.

In another example embodiment, a first device may send a first frame to a second device for requesting data frames that are pending at the second device. The first device receives an acknowledgement frame including information regarding a number of pending and approved data frames (NPAD) for transmission to the first device. The first device may receive a plurality of data frames in response to the acknowledgement frame. The first frame may include information regarding length of active time interval (LATI) of the first device, and the NPAD may be determined based on the LATI.

BRIEF DESCRIPTION OF THE DRAWINGS

A more detailed understanding may be had from the following description, given by way of example in conjunction with the accompanying drawings wherein:

FIG. 6 shows a general medium access control (MAC) frame format;

FIG. 7 shows a format of the frame control field in the MAC frame of FIG. 6;

DETAILED DESCRIPTION

Figure 1A:
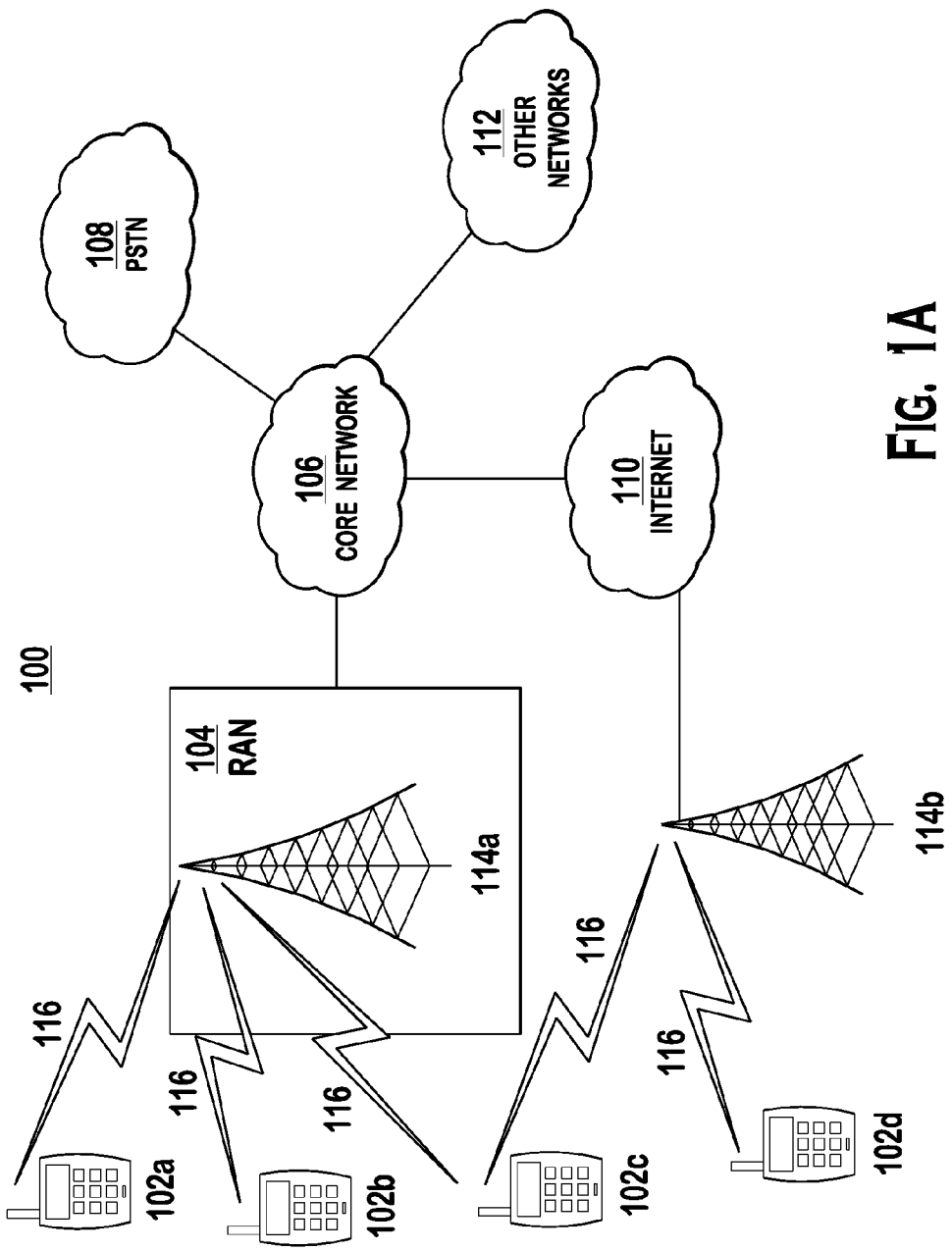
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
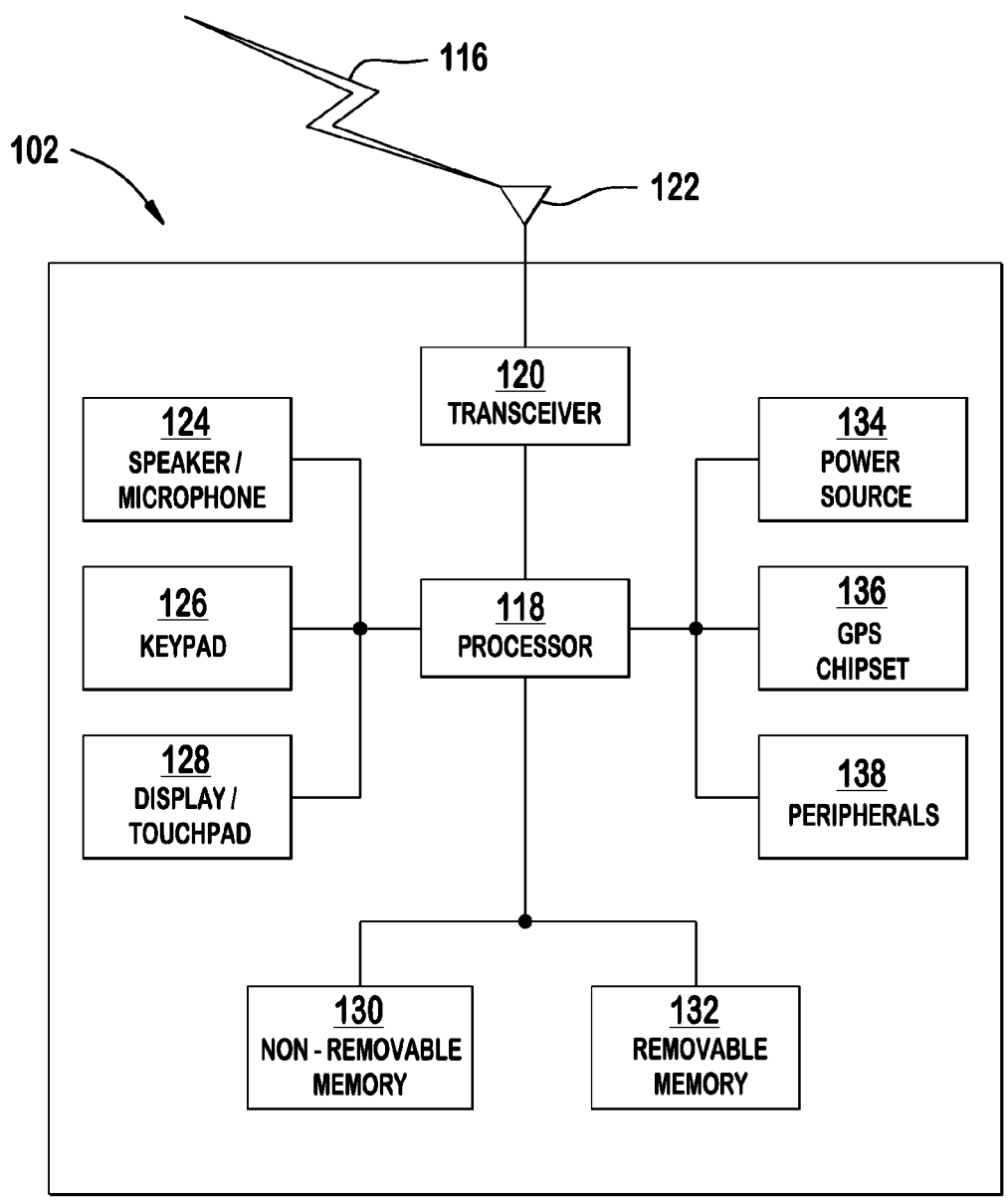
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
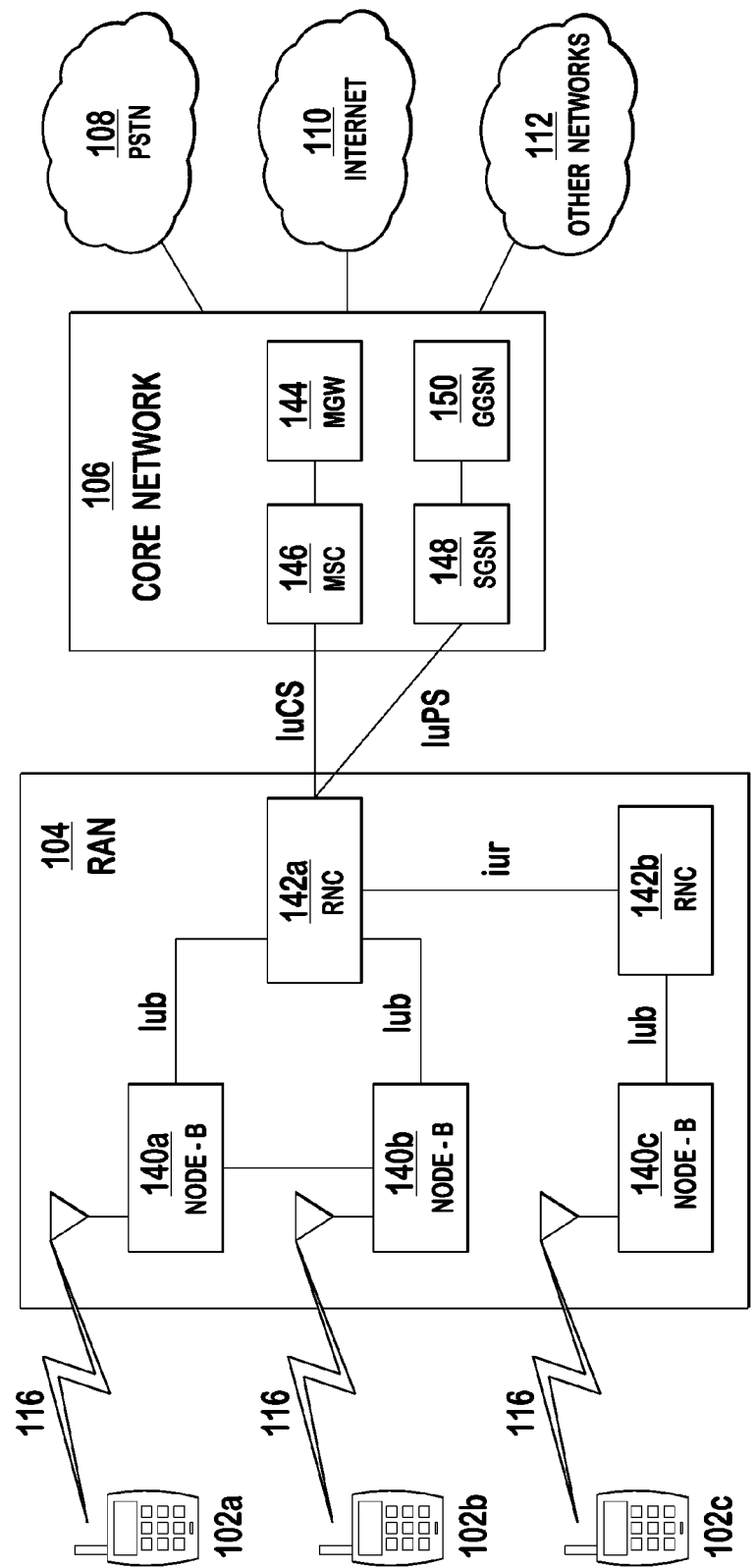
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Throughout the disclosure, the terms "continuous transmission" or "transmit continuously" mean that a WTRU or a coordinator may transmit a data packet without performing a contention-based channel access procedure to obtain a transmission opportunity on a channel in the WPAN, and each data packet transmission does not necessarily occur continuously in time. Hereafter, CSMA/CA will be used as an example of the contention-based channel access procedure throughout the disclosure, but any contention-based channel access mechanism may be used.

Figure 2A:
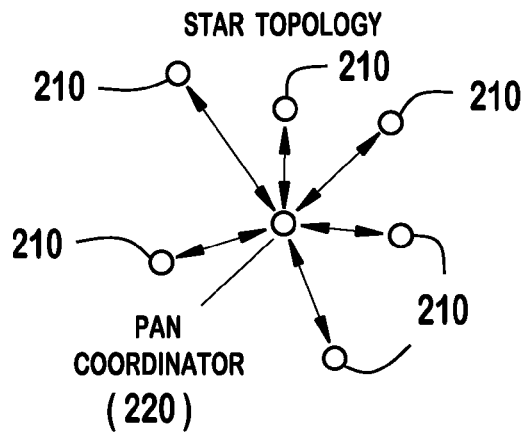
FIGS. 2A and 2B show an example WPAN in which one or more disclosed embodiments may be implemented.
Figure 2B:
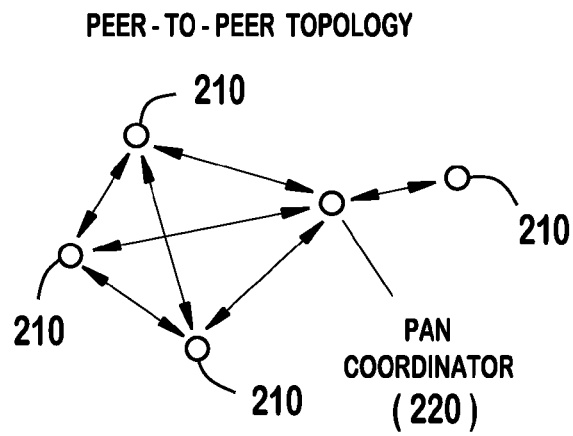

FIGS. 2A and 2B show an example WPAN in which one or more disclosed embodiments may be implemented. The WPAN comprises several WTRUs 210 including a coordinator 220. A WTRU 210 may be a reduced-function device (RFD) or a full-function device (FFD). Two or more WTRUs 210 within an operating space communicating on the same physical channel constitute a WPAN. The WPAN includes at least one WTRU operating as a coordinator 220. A coordinator 220 may provide synchronization services through the transmission of beacons. Alternatively, the WPAN may operate without beacon. The embodiments disclosed herein are applicable to both cases.

The WPAN may operate in the star topology as shown in FIG. 2A or in the peer-to-peer topology as shown in FIG. 2B. In the star topology, the communication is established between WTRUs 210 and a coordinator 220. The coordinator 220 is the primary controller of the WPAN. The peer-to-peer topology may have a coordinator, but any WTRU may communicate with any other WTRU as long as they are in range of one another. Peer-to-peer topology allows more complex network formations to be implemented, such as mesh networking topology. A peer-to-peer network may be ad hoc, self-organizing, or self-healing. It may allow multiple hops to route messages from any WTRU to another on the network.

Figure 3:
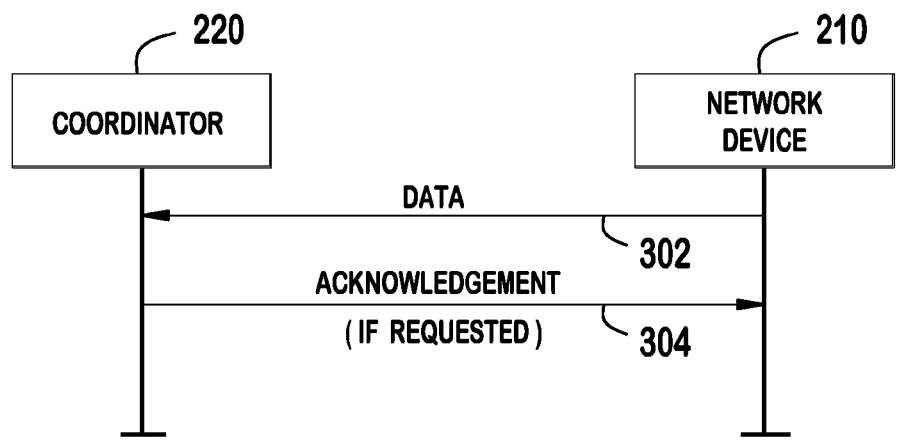
FIG. 3 is a signaling diagram of an example process for data transmission from a WTRU to a coordinator in a WPAN.

FIG. 3 is a signaling diagram of an example process for data transmission from a WTRU 210 to a coordinator 220 in a WPAN. For the communication from a WTRU 210 to a coordinator 220, the WTRU 210 transmits a data frame to the coordinator 220 after obtaining a transmission opportunity using a contention-based channel access procedure (such as unslotted carrier sense multiple access with collision avoidance (CSMA-CA)) (302). The coordinator 220 may send an acknowledgement (ACK) frame to the WTRU 210 depending on whether the data frame requires an ACK (304).

Figure 4:
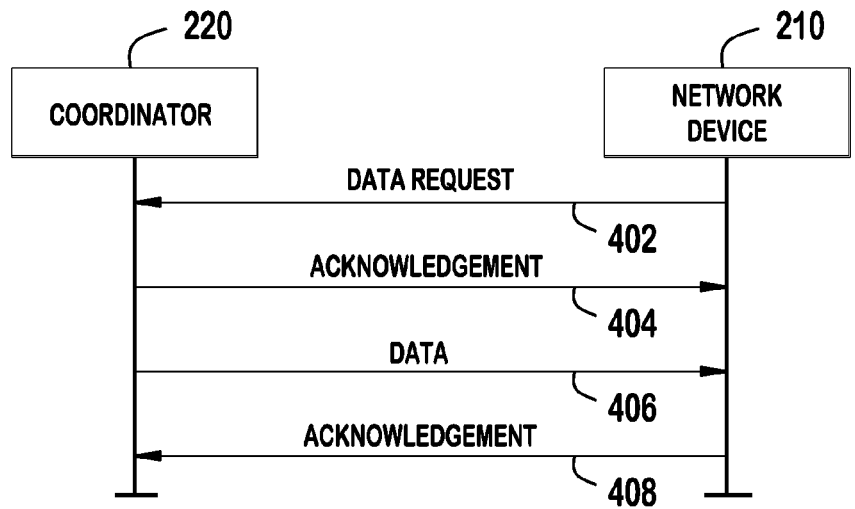
FIG. 4 is a signaling diagram of an example process for data transmission from a coordinator to a WTRU in a WPAN.

FIG. 4 is a signaling diagram of an example process for data transmission from a coordinator 220 to a WTRU 210 in a WPAN. For the communication from a coordinator 220 to a WTRU 210, a receiver-initiated process is used. The WTRU 210 first sends a data request frame to the coordinator 220 using unslotted CSMA-CA to check if there is some data pending for the WTRU 210 (402). The coordinator 220 then informs the WTRU 210 whether or not there is a data frame pending for the WTRU 210 by sending an ACK to the WTRU 210 (404). On a condition that there is a data frame pending, the coordinator 220 transmits the data frame to the WTRU 210 using unslotted CSMA-CA (406). If requested, the WTRU 210 may acknowledge the successful reception of the data frame by sending an ACK to the coordinator 220 (408).

Figure 5:
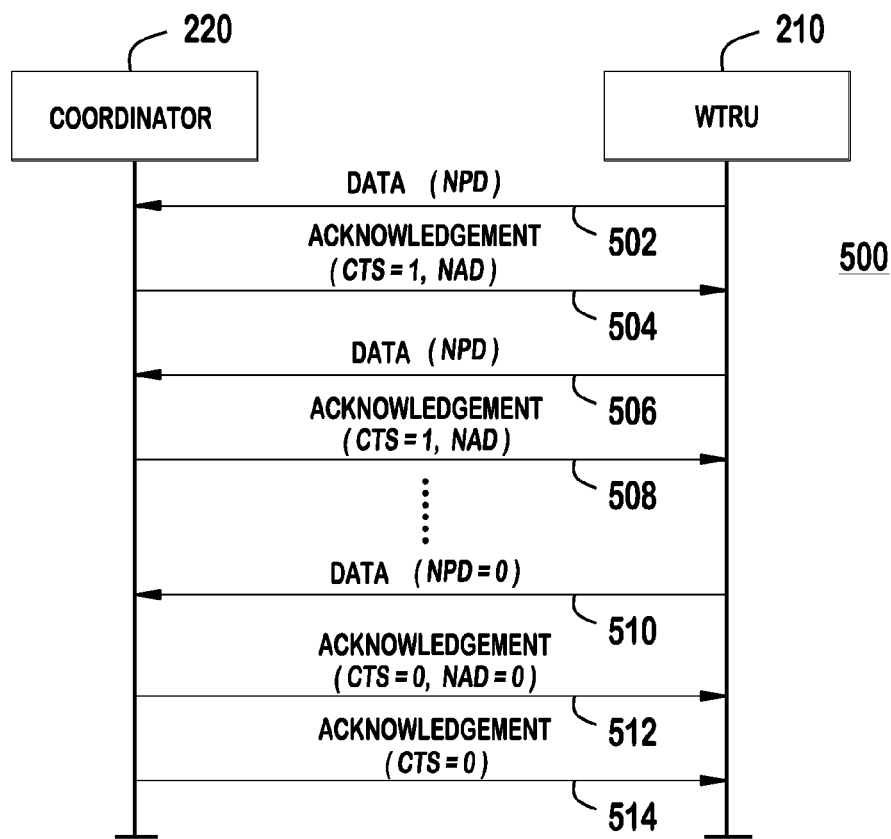
FIG. 5 is a signaling diagram of an example process of transmission from a WTRU to a coordinator in accordance with one embodiment.

FIG. 5 is a signaling diagram of an example process 500 of transmission from a WTRU 210 to a coordinator 220 in accordance with one embodiment. A WTRU 210 sends a data frame to a coordinator 220 after obtaining a transmission opportunity using a contention-based channel access procedure (such as unslotted CSMA/CA) (502). The data frame includes an information element or field indicating the number of pending data frames (NPD) at the WTRU 210, (i.e., the number of data frames to be transmitted to the coordinator 220).

The coordinator 220 receives the data frame and extracts the NPD information. The coordinator 220 determines how many data frames the WTRU 210 may transmit continuously without using unslotted CSMA-CA, which is referred to as the number of approved data frames (NAD). The coordinator 220 then sends an ACK including the NAD to the WTRU 210 (504).

The NAD may be equal to or smaller than the NPD. When determining the NAD, the coordinator 220 may consider factors, such as fairness, service properties, the NPD, or the like. For example, if a WTRU always requests a big NPD, it may starve other WTRUs and cause unfairness among WTRUs if the coordinator always grants NAD=NPD for this WTRU. In another case where a WTRU generates more useful and time-critical information, the coordinator may grant more transmission opportunities to such WTRU. Any algorithm or policies may be employed for determining the NAD.

After receiving the ACK from the coordinator 220, the WTRU 210 may start to continuously transmit data frames without using unslotted CSMA/CA (506, 510). The channel is reserved until completion of the transmissions of the NAD data packets unless it is terminated early by the coordinator. For the data packet transmissions, the WTRU 210 does not perform the CSMA/CA procedure to obtain the transmission opportunity, but may simply start transmissions of the packets. In each data frame transmitted, the WTRU 210 may include an NPD for the remaining data packets. The NPD may be further decreased if, for example, some data frames are dropped, for example, due to time expiration.

The coordinator 220 may send an ACK to each data frame received (508, 512). The ACK frame may include CTS set to '1' and updated NAD value. Other WTRUs not involved in the continuous packet transmission may refrain from accessing the channel by detecting the channel or detecting the ACK packet with CTS=1.

When all NAD packets have been transmitted and acknowledged, the coordinator 220 may send an additional ACK with CTS=0 and NAD=0, which indicates the ending of current continuous transmission cycle with the WTRU 210, which informs other WTRUs of the release of the channel (510).

During the continuous transmission cycle, the coordinator 220 may send an ACK with CTS=0 (or any other frame) to halt the continuous transmission before the WTRU 210 completes transmitting all NAD packets, (e.g., if there is a collision).

FIG. 6 shows a general MAC frame format 600. The MAC frame 600 includes a MAC header (MHR) including a frame control field 610. FIG. 7 shows a format of the frame control field 610 in the MHR. The frame type subfield 612 indicates the type of the frame, for example, beacon, data, acknowledgement, MAC command, etc. The frame pending subfield 614 indicates whether the device sending the frame has additional data to send to the recipient following the current transfer. The acknowledgment request subfield 616 specifies whether an acknowledgment is required from the recipient device on receipt of a data or MAC command frame.

Figure 8:
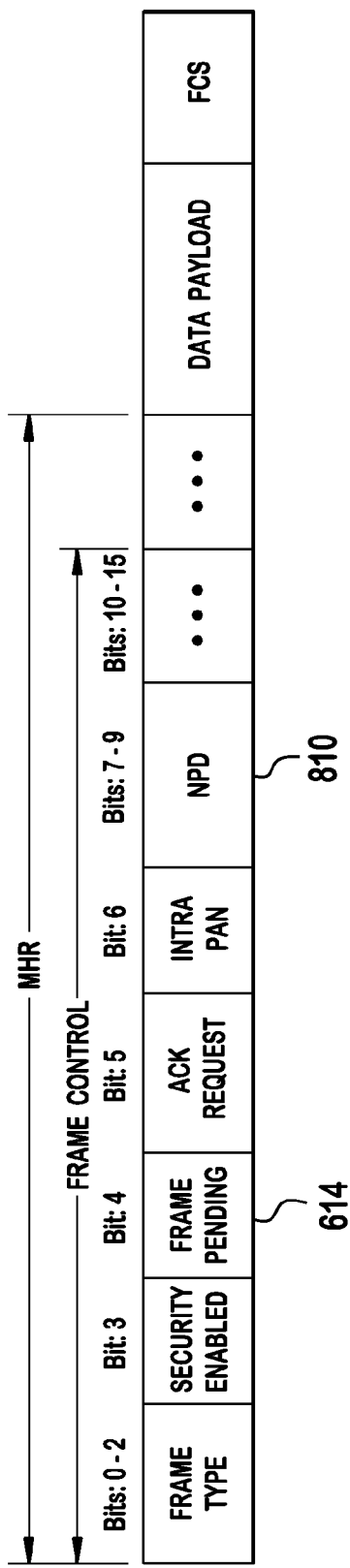
FIG. 8 shows an example MAC frame format for data from a WTRU to a coordinator including number of pending data frames (NPD) in accordance with one embodiment.

FIG. 8 shows an example MAC frame format for data from a WTRU 210 to a coordinator 220 including NPD 810 in accordance with one embodiment. The NPD 810 may be indicated, for example, by using reserved bits 618 (e.g., bits 7-9) in a frame control field 610 of the MHR when the WTRU 210 sends a data frame to the coordinator 220. When the WTRU 210 starts to send a data frame, on a condition that there is no more data frame pending, the frame pending subfield 614 is set to '0'; otherwise, the frame pending subfield 614 is set to '1.' When the frame pending subfield 614 is set to '1', (i.e., the WTRU 210 has more data to send continuously without using CSMA-CA in accordance with any embodiments disclosed herein), the NPD may be encoded, for example, into the reserved bits 810 (bits 7-9) of the frame control field 610 of the MAC frame. Table 1 shows an example encoding of the bits for the NPD (bits 7-9 of the frame control field) in accordance with one embodiment. It should be noted that Table 1 is provided as an example, and different encoding may used.

TABLE 1

| Bits $b_9b_8b_7$ | NPD |
| --- | --- |
| 000 | 1 |
| 001 | 2 |
| 010 | 3 |
| 011 | 4 |
| 100 | 5 |
| 101 | 6 |
| 110 | 7 |
| 111 | 8 |

Figure 9:
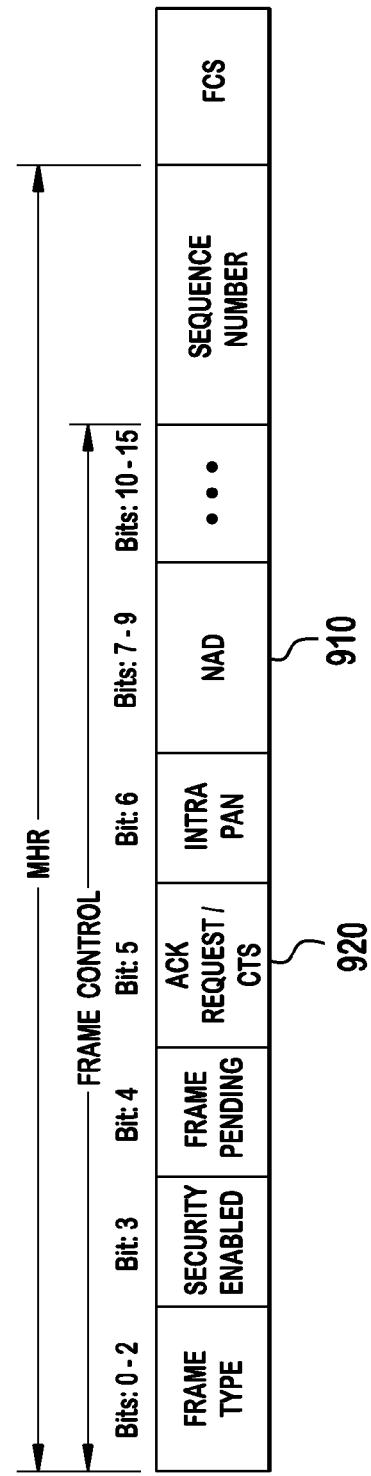
FIG. 9 shows an example MAC frame format for acknowledgement (ACK) from a coordinator to a WTRU including number of approved data frames (NAD) and an ACK request subfield set as clear-to-send (CTS) in accordance with one embodiment.

FIG. 9 shows an example MAC frame format for ACK from a coordinator 220 to a WTRU 210 including NAD and an ACK request subfield set as CTS in accordance with one embodiment. The NAD 910 may be indicated using the reserved bits (bits 7-9) of the frame control field 610 in the MAC frame for acknowledgement that is sent from the coordinator 220 to the WTRU 210. The ACK request subfield in the frame control field specifies whether an acknowledgment is required from the recipient on receipt of a data or MAC command frame. The coordinator 220 may use the ACK request subfield 920 in the frame control field to represent CTS since the ACK frame does not need to be acknowledged. The frame control subfield 920 set with CTS=1 notifies the WTRU that it may start to transmit NPD data frames without using CSMA/CA. Table 2 shows an example encoding of the bits for NAD in accordance with one embodiment. It should be noted that Table 2 is provided as an example, and different encoding may used.

TABLE 2

| Bits $b_9b_8b_7$ | NAD |
| --- | --- |
| 000 | 1 |
| 001 | 2 |
| 010 | 3 |
| 011 | 4 |
| 100 | 5 |
| 101 | 6 |
| 110 | 7 |
| 111 | 8 |

Figure 10:
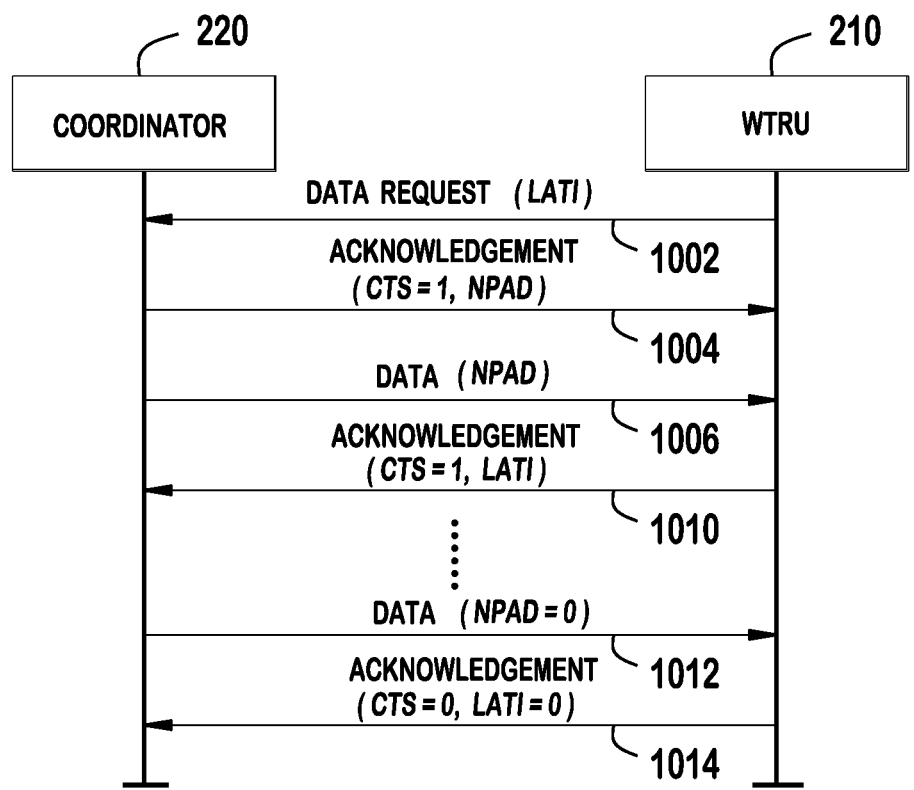
FIG. 10 is a signaling diagram of an example process of transmitting data from a coordinator to a WTRU in accordance with one embodiment.

FIG. 10 is a signaling diagram of an example process of transmitting data from a coordinator to a WTRU in accordance with one embodiment. A WTRU 210 sends a data request to a coordinator 220 (1002). The WTRU may include a length of active time interval (LATI) in the data request frame indicating the time period that the WTRU will be active. The coordinator 220 acknowledges successful reception of the data request by sending an ACK frame with a number of pending and approved data frame (NPAD) available (1004). The coordinator 220 may set the ACK request bit 616 in the frame control field in the ACK frame to '1' (i.e., indicating CTS) to announce the start of continuous transmission. The coordinator may determine the NPAD based on the LATI information (if included), fairness, the amount of data pending for the WTRU, and other considerations.

The coordinator 220 sends data frames using continuous transmission mode until all NPAD packets are transmitted (1006). For each received data frame, the WTRU 210 may send back an ACK frame with CTS=1 and LATI reduced accordingly, if included (1008). The coordinator may send the last frame with NPAD=0 (1010). For the acknowledgement to the last data (NPAD=0), the WTRU 210 may set CTS to '0,' which implies the ending of the continuous transmission (1012).

Figure 11:
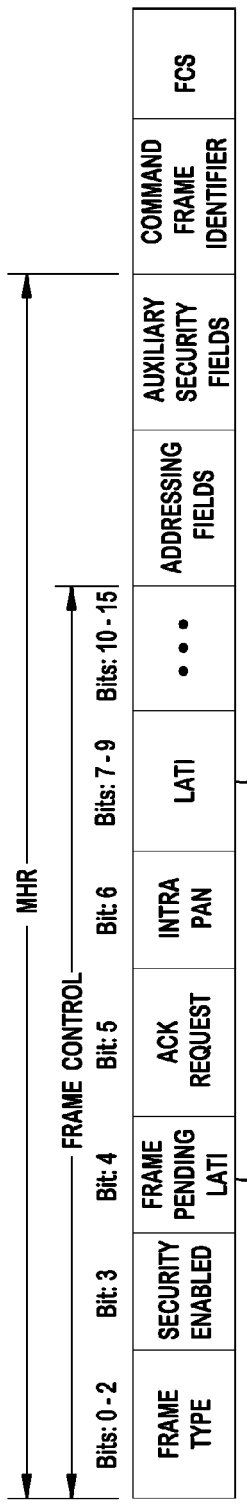
FIG. 11 shows an example format of a data request frame sent from a WTRU to a coordinator with length of active time interval (LATI) in accordance with one embodiment.

FIG. 11 shows an example format of a data request frame sent from a WTRU to a coordinator with LATI in accordance with one embodiment. The WTRU 210 may utilize the frame pending field 1102 (bit 4) and the reserved bits 1104 (bits 7-9) in the frame control field (i.e., total 4 bits) to encode the LATI, if signaled. With four bits, sixteen LATI values or LATI ranges may be supported. Table 3 shows an example encoding of the LATI with the frame pending field 1102 and the reserved bits 1104 in the frame control field. It should be noted that Table 3 is provided as an example, and different encoding may used.

TABLE 3

| Extra Info and Frame Pending Bits $b_9b_8b_7b_4$ | LATI |
| --- | --- |
| 0000 | 1 |
| 0001 | 2 |
| 0010 | 3 |
| 0011 | 4 |

TABLE 3-continued

| Extra Info and Frame Pending Bits $b_9b_8b_7b_4$ | LATI |
|---|---|
| 0100 | 5 |
| 0101 | 6 |
| 0110 | 7 |
| 0111 | 8 |
| 1000 | 9 |
| 1001 | 10 |
| 1010 | 11 |
| 1011 | 12 |
| 1100 | 13 |
| 1101 | 14 |
| 1110 | 15 |
| 1111 | 16 |

Figure 12:
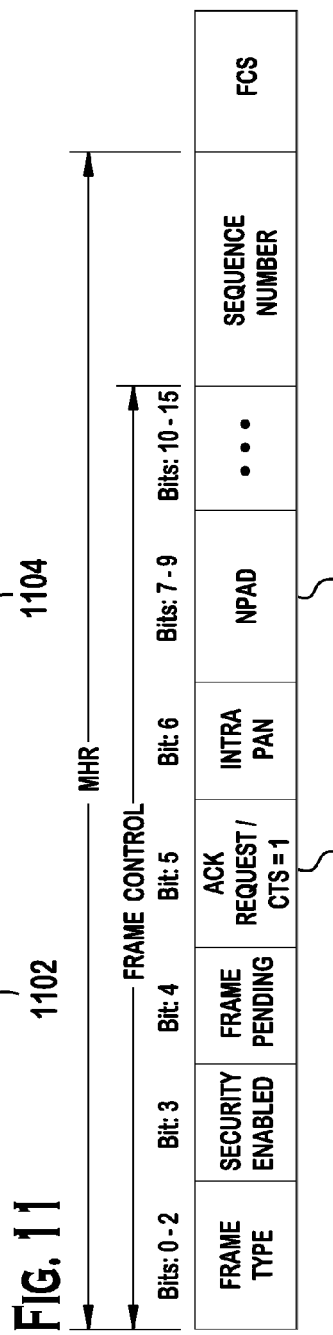
FIG. 12 shows an example format of an ACK frame transmitted from a coordinator to a WTRU with number of pending and approved data frames (NPAD) and ACK request field set to indicate CTS.

FIG. 12 shows an example format of an ACK frame transmitted from a coordinator to a WTRU with NPAD and ACK request field set to indicate CTS. The coordinator 220 may use the ACK request field 1202 to represent CTS since the ACK frame does not need ACK request. The three reserved bits (bits 7-9) 1204 may be used to encode the NPAD. Table 4 shows an example encoding of the NPAD. It should be noted that Table 4 is provided as an example, and different encoding may used.

TABLE 4

| Extra Information Bits $b_9b_8b_7$ | NPAD |
|---|---|
| 000 | 1 |
| 001 | 2 |
| 010 | 3 |
| 011 | 4 |
| 100 | 5 |
| 101 | 6 |
| 110 | 7 |
| 111 | 8 |

Figure 13:
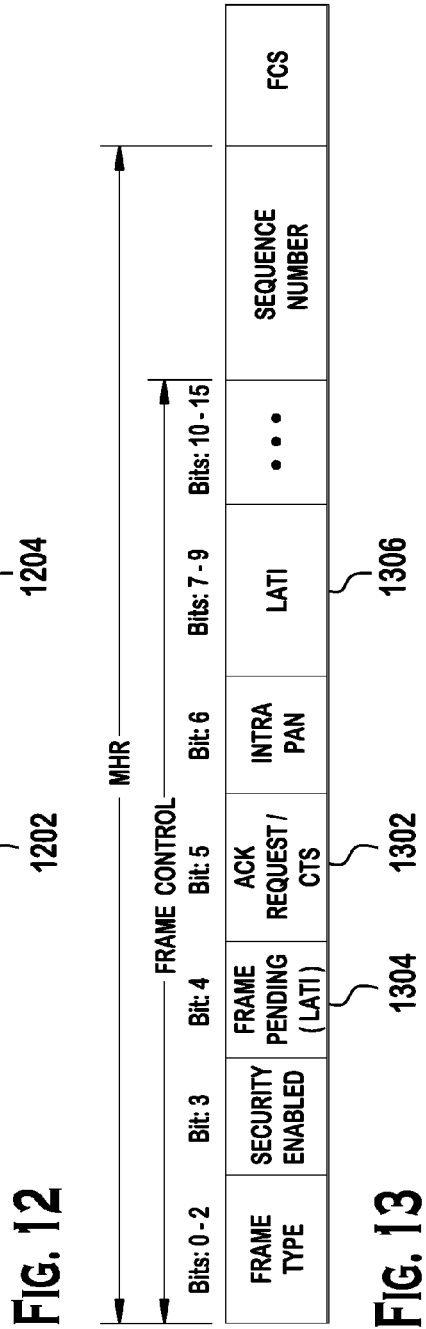
FIG. 13 shows an example format of an ACK frame transmitted from a WTRU to a coordinator in accordance with this embodiment.

FIG. 13 shows an example format of an ACK frame transmitted from a WTRU to a coordinator in accordance with this embodiment. The WTRU 210 may use the ACK request field 1302 to encode 1-bit CTS, and the frame pending field 1304 and the reserved bits 1306 (bits 7-9) to encode the LATI.

In another embodiment, a new MAC command (referred to as a data request and ACK (DRACK)) may be defined to exchange information between the coordinator 220 and the WTRU 210. The new MAC command DRACK may be used in both directions to transmit information such as NPD and NAD in upstream and LATI and NPAD in downstream.

Figure 14:
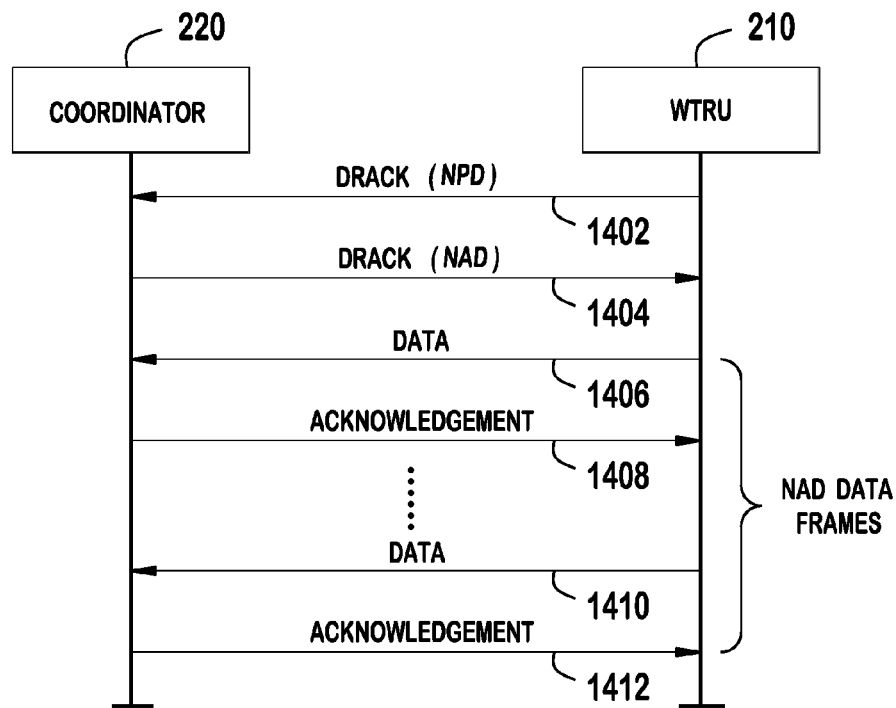
FIG. 14 is a signaling diagram of an example process of transmitting data from a WTRU to a coordinator using a data request and acknowledgement frame (DRACK) in accordance with one embodiment.

FIG. 14 is a signaling diagram of an example process of transmitting data from a WTRU 210 to a coordinator 220 using a DRACK frame in accordance with one embodiment. A WTRU 210 sends a DRACK frame with NPD to a coordinator 220 (1402), and the coordinator 220 sends a DRACK frame with NAD to the WTRU 210 (1404). Once the WTRU 210 receives the DRACK frame with NAD, the WTRU 210 sends data to the coordinator 220 continuously without using CSMA-CA (1406, 1410). The coordinator 220 may acknowledge receipt of the data frames (1408, 1412).

In FIG. 14, the acknowledgement messages may be sent from the coordinator 220 to the WTRU 210. The acknowledgement message may be requested by the WTRU 210 in each data message. The WTRU 210 may indicate in each data message to the coordinator 220 whether the data message needs to be acknowledged or not. For example, the WTRU 210 may indicate the need of acknowledgement in the last data message so that coordinator 220 may use send one acknowledgement to acknowledge all data messages.

Figure 15:
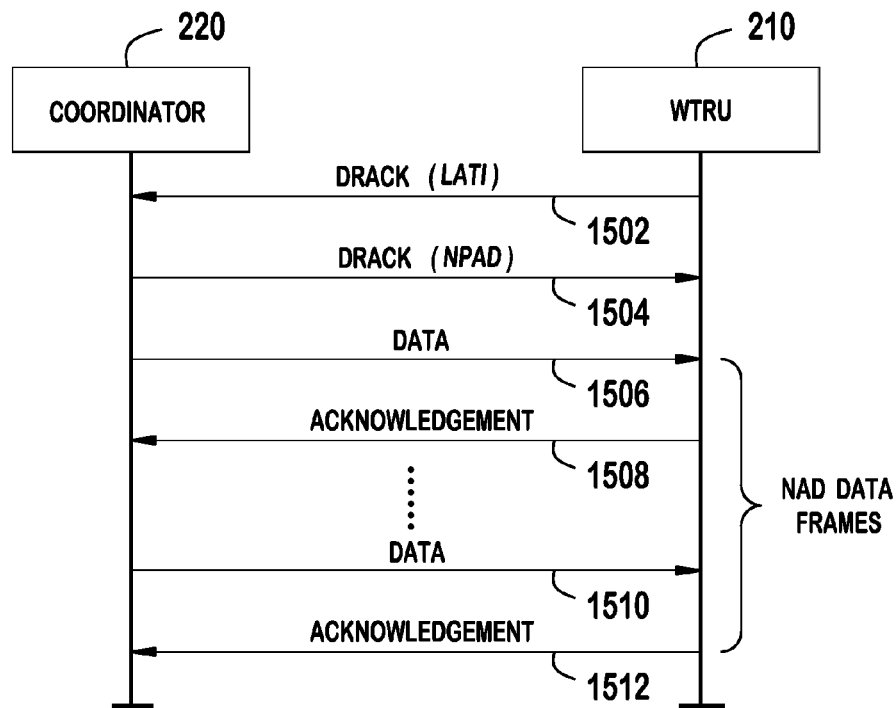
FIG. 15 is a signaling diagram of an example process of transmitting data from a coordinator to a WTRU using a DRACK frame in accordance with one embodiment.

FIG. 15 is a signaling diagram of an example process of transmitting data from a coordinator 220 to a WTRU 210 using a DRACK frame in accordance with one embodiment. A WTRU 210 sends a DRACK frame to a coordinator 220 (1502). The WTRU 210 may include an LATI in the DRACK frame. The coordinator 220 sends a DRACK frame with NPAD to the WTRU 210 (1504). After sending the DRACK frame with NPAD, the coordinator 220 sends data to the WTRU 210 continuously without using CSMA-CA (1506, 1510). The WTRU 210 may acknowledge receipt of the data frames (1508, 1512).

In FIG. 15, the acknowledgement messages may be sent from the WTRU 210 to the coordinator 220. The acknowledgement message may be requested by the coordinator 220 in each data message. The coordinator 220 may indicate in each data message to the WTRU 210 whether the data message needs to be acknowledged or not. For example, the coordinator 220 may indicate the need of acknowledgement in the last data message so that WTRU 210 may use send one acknowledgement to acknowledge all data messages.

As shown in FIGS. 14 and 15, the WTRU 210 or the coordinator 220 may continuously transmit packets without using CSMA/CA after exchanging DRACK. The WTRU 210 may send a DRACK frame using unslotted CSMA/CA, while the coordinator 220 may send a DRACK frame without using unslotted CSMA/CA.

Figure 16:
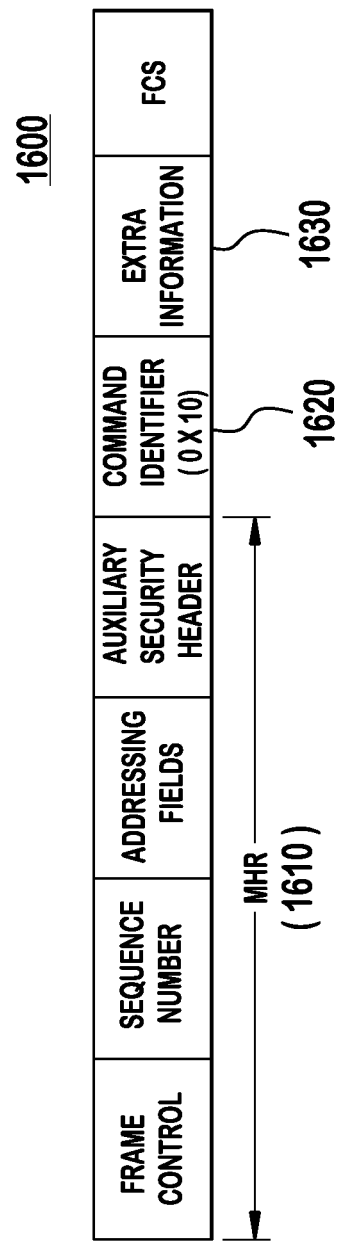
FIG. 16 shows an example format of the DRACK frame.

FIG. 16 shows an example format of the DRACK frame 1600. The DRACK frame may have the same frame format as the data request command. The DRACK frame 1600 includes a MAC header (MHR) 1610, a command identifier field 1620, and an extra information field 1630. The extra information field 1630 may carry information such as NPD, NAD, LATI, and NPAD. For example, the first two bits ($b_0b_1$) of the extra information field 1630 may be used to indicate the type of information contained in the rest of the extra information field 1630 (for example, $b_0b_1$=00 for NPD, $b_0b_1$=01 for NAD, $b_0b_1$=10 for LATI, $b_0b_1$=11 for NPAD). The remaining bits of the extra information field 1630 carries NPD, NAD, LATI, or NPAD. The encoding of the information included in the extra information field 1630 may be based on Tables 1-4.

The continuous data transmission in accordance with the embodiments disclosed herein may be enabled and disabled by setting a particular bit in the MAC frame, (e.g., any bit in a MAC header). For example, a third bit of the frame type subfield (i.e., $b_2$) may be set to '1' to enable the continuous data transmission mechanism and set to '0' to disable the continuous data transmission mechanism.

Table 5 shows the values of the frame type subfield currently defined in IEEE 802.15.4-2006. As shown in Table 5, the third bit (b2) is currently set to '0.' By setting/unsetting the third bit of the frame type field, the continuous data transmission mechanism may be dynamically enabled or disabled.

TABLE 5

| Frame Type value $b_2b_1b_0$ | Description |
|---|---|
| 000 | Beacon |
| 001 | Data |
| 010 | Acknowledgement |
| 011 | MAC Command |
| 100-111 | Reserved |

It should be noted that the embodiments for encoding of the NPD, NAD, LATI, and NPAD disclosed above are provided as an example, and the above information may be conveyed via any other fields or subfields of the MAC frame (MAC header or body) or any frame type and any encoding methods may be used.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for data transmissions in a wireless network, the method comprising:
    obtaining, by a first device, a first transmit opportunity (TxOP) via a contention-based channel access procedure;
    transmitting, by the first device, a first frame to a second device during the first TxOP, wherein the first frame includes information indicating a number of pending data frames (NPD) to be transmitted from the first device to the second device;
    receiving, by the first device, an acknowledgement (ACK) frame in response to the first frame, wherein the ACK frame indicates an end of the first TxOP and includes information indicating a number of approved data frames (NAD) for transmission from the first device to the second device; and
    transmitting, by the first device, a plurality of data frames without performing the contention-based channel access procedure for obtaining a second TxOP in response to the ACK frame.

2. The method of claim 1, wherein the NAD is equal to or smaller than the NPD.

3. The method of claim 1, wherein the NAD is determined based on a factor including at least one of fairness among a plurality of devices, service properties, and the NPD.

4. The method of claim 1, wherein the first frame comprises a data request and acknowledgement (DRACK) frame, the ACK frame comprises a DRACK frame, or the first frame and the ACK frame each comprise a DRACK frame.

5. The method of claim 1, wherein the first device terminates sending the plurality of data frames on a condition that a termination indication is received from the second device.

6. The method of claim 1, wherein the channel access mechanism is carrier sense multiple access/collision avoidance (CSMA/CA).

7. A method for data transmissions in a wireless network, the method comprising:
    obtaining, by a first device, a transmit opportunity (TxOP) via a contention-based channel access procedure;
    transmitting, by the first device, a first frame to a second device during the TxOP, wherein the first frame is a request for data frames that are pending at the second device to be transmitted to the first device;
    receiving, by the first device, an acknowledgement (ACK) frame in response to the first frame, wherein the ACK frame indicates an end of the TxOP and includes information indicating a number of pending and approved data frames (NPAD) for reception by the first device; and
    receiving, by the first device, a plurality of data frames indicated by the ACK frame.

8. The method of claim 7, wherein the first frame includes information indicating a length of active time interval (LATI) of the first device, and the NPAD is based on the LATI.

9. The method of claim 7, wherein the first frame comprises a data request and acknowledgement (DRACK) frame, the ACK frame comprises a DRACK frame, or the first frame and the ACK frame each comprise a DRACK frame.

10. The method of claim 7, wherein the ACK frame includes a clear-to-send (CTS) bit indicating a channel reservation for the second device for transmission of the plurality of data frames to the first device.

11. The method of claim 7, wherein the first device sends a termination indication to the second device indicating that the second device should terminate sending the plurality of data frames.

12. The method of claim 7, wherein the channel access mechanism is carrier sense multiple access/collision avoidance (CSMA/CA).

13. A device for data transmissions in a wireless network, the device comprising:
    a receiver configured to obtain a first transmit opportunity (TxOP) via a contention-based channel access procedure;
    a transmitter configured to transmit a first frame to a second device using the first TxOP, wherein the first frame includes information indicating a number of pending data frames (NPD) to be transmitted to the second device;
    the receiver further configured to receive an acknowledgement (ACK) frame in response to the first frame, wherein the ACK frame indicates an end of the first TxOP and includes information indicating a number of approved data frames (NAD) for transmission from the first device to the second device; and
    a transmitter configured to transmit a plurality of data frames without performing the contention-based channel access procedure for obtaining a second TxOP in response to the ACK frame.

14. The device of claim 13, wherein the first frame comprises a data request and acknowledgement (DRACK) frame, the ACK frame comprises a DRACK frame, or the first frame and the ACK frame each comprise a DRACK frame.

15. The device of claim 13, wherein the first device terminates sending the plurality of data frames on a condition that a termination indication is received from the second device.

16. The device of claim 13, wherein the channel access mechanism is carrier sense multiple access/collision avoidance (CSMA/CA).

17. A device for data transmissions in a wireless network, the device comprising:
    a receiver configured to obtain a transmit opportunity (TxOP) via a contention-based channel access procedure;
    a transmitter configured to transmit a first frame to a second device using the TxOP, wherein the first frame is a request for data frames that are pending at the second device to be transmitted to the first device;
    the receiver further configured to receive an acknowledgement (ACK) frame in response to the first frame, wherein the ACK frame indicates an end of the TxOP and includes information indicating a number of pending and approved data frames (NPAD) for transmission to the first device, and receive a plurality of data frames in response to the ACK frame.

18. The device of claim 17, wherein the first frame includes information indicating a length of active time interval (LATI) of the first device, and the NPAD is based on the LATI.

19. The device of claim 17, wherein the first frame comprises a data request and acknowledgement (DRACK) frame, the ACK frame comprises a DRACK frame, or the first frame and the ACK frame each comprise a DRACK frame.

20. The device of claim 17, wherein the first device sends a termination indication to the second device indicating that the second device should terminate sending the plurality of data frames.

* * * * *